Oct. 5, 1965         G. L. BROOKMAN ETAL         3,210,075
           SELF-PROPELLED MERRY-GO-ROUND FOR CHILDREN
Filed July 15, 1963                              2 Sheets-Sheet 1

INVENTORS
GLENNON L. BROOKMAN
DONALD E. NEELY
BY Cohn and Powell
ATTORNEYS

United States Patent Office 3,210,075
Patented Oct. 5, 1965

3,210,075
SELF-PROPELLED MERRY-GO-ROUND
FOR CHILDREN
Glennon L. Brookman and Donald E. Neely, St. Louis, Mo., assignors to Shepard Engineering Co., St. Louis, Mo., a corporation of Missouri
Filed July 15, 1963, Ser. No. 295,021
6 Claims. (Cl. 272—33)

This invention relates generally to improvements in a self-propelled merry-go-round for children, and more particularly to an improved drive mechanism for turning the seat assembly selectively in either direction, such action being within the control of at least one rider.

An important objective is achieved by the structural arrangement of a seat means rotatively mounted on the base, and a drive connection between the seat means and a ratchet fixed to the base for turning the seat about an axis selectively in either direction.

Another important object is realized by the provision of a plate rotatively mounted on the base about the ratchet, pawls pivotally mounted to the plate and attached to the ratchet, and a cam carried by a bar that is pivotly mounted to the plate, the cam selectively engaging the pawls with the ratchet upon relative pivotal movement of the plate and bar for controlling the direction of seat rotation.

Still another object is provided by the specific provision of a pair of pawls pivotally mounted to the plate, one of the pawls engaging the ratchet to preclude rotation of the plate in one direction, and the other pawl engaging the ratchet to preclude rotation of the plate in the opposite direction, and of the resilient means interconnecting the pawls and tending to urge the pawls into engagement with the ratchet. The cam will selectively urge one or the other of the pawls into engagement with the ratchet to control the direction of motion.

An important objective is afforded by the particular structure of the cam and its connection to the associated bar and plate so that the parts can be readily assembled or disassembled, and where by an effective and positive action will be obtained with the pair of associated pawls.

Another important objective is achieved by the structural arrangement of the drive mechanism and its operative mounting and connection with the base, of the center post defining the rotative axis, and of the mounting of the seat assembly, in that the device presents an extremely compact unit with a minimum of parts.

Yet another important objective is realized by fixing the ratchet to a base platform, by placing a pair of spaced plates about the ratchet so that one overlies the ratchet, and by extending a post upwardly through the platform and plates about which the plates can rotate. A bearing interconnects a sleeve disposed over the post with one plate overlying the ratchet, the bearing mounting both the plates and sleeve for relative rotation.

An important object is provided by the specific structural arrangement of the bearing with the plates, post and sleeve to obtain a compact unit having a highly efficient rotary mechanism.

Another important objective is to provide a merry-go-round of this general type that is simple and durable in construction, economical to manufacture and assemble, highly efficient in operation, and which can be readily utilized by children with little or no instruction.

The foregoing and numerous other objects and advantages of the invention will more clearly appear from the following detailed description of a preferred embodiment, particularly when considered in connection with the accompanied drawings, in which.

Figure 1:
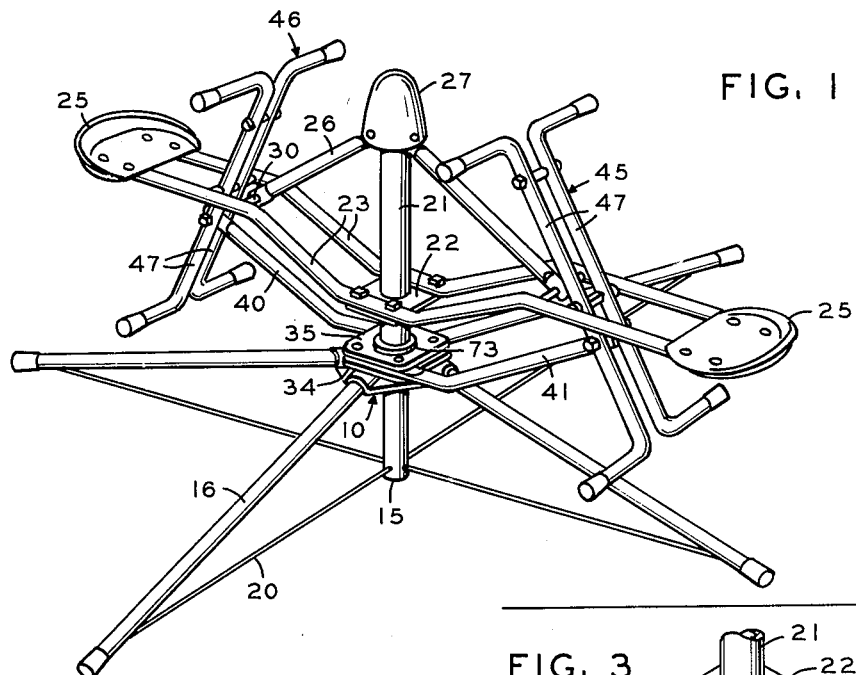
FIG. 1 is a perspective view of the merry-go-round, showing only a two-seater for purposes of clarity.
Figure 4:
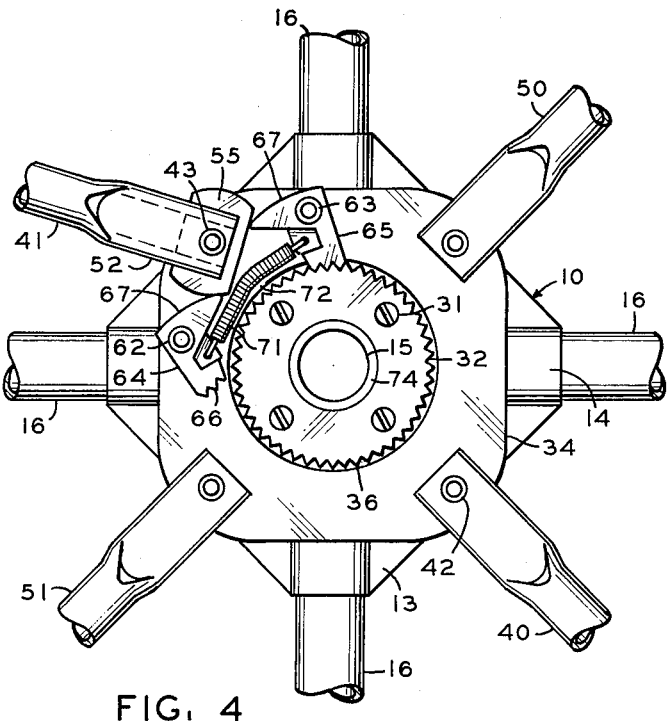
FIG. 4 is a view as seen along line 4—4 of FIG. 2, illustrating four push bars to indicate a four-seater merry-go-round.

Referring now by characters of reference to the drawings, and first to FIG. 1, it will be apparent that the merry-go-round is adapted particularly for children. FIG. 1 illustrates a two-seater, but will be obvious that a four seater can be easily obtained merely by attaching another seat assembly at right angles to the one shown in FIG. 1. In fact, as will appear upon later description of parts, FIG. 4 illustrates the drive mechanism with four associated push bars suggesting a four-seater unit.

Figures 2, 3:
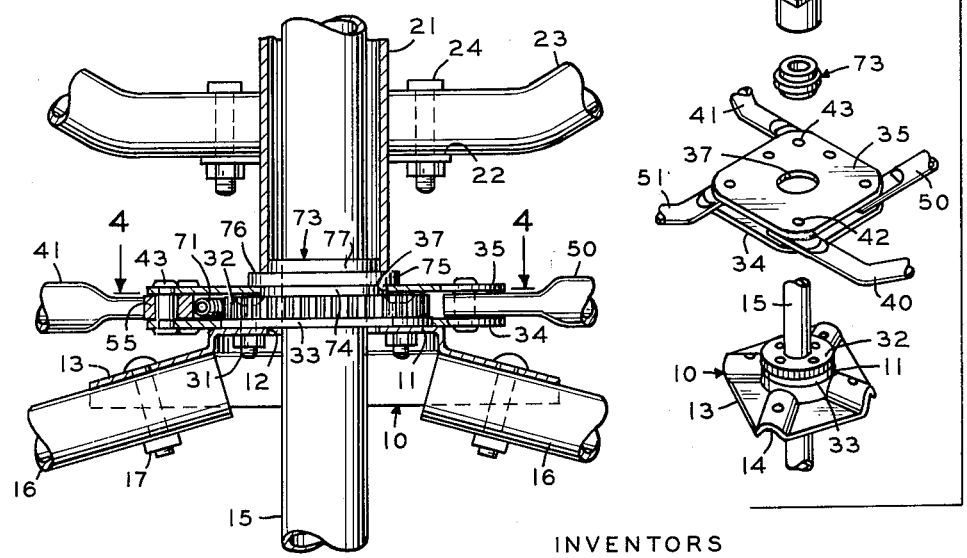
FIG. 2 is a fragmentary cross section view of the drive mechanism as seen in a vertical plane passed through the rotative axis.
FIG. 3 is an exploded perspective view of the parts shown in FIG. 2.

The merry-go-round includes a base having a substantially square leg plate indicated generally at 10. As is best seen in FIG. 2, the leg plate 10 has a substantially flat circular platform 11 provided with a center aperture 12, and has a laterally extending flange 13. The flange 13 is provided with elongate arcuate corner formations 14 extending radially outward from the platform 11.

For reasons which will later appear, the center post 15 is disposed vertically and is extended upwardly through the platform aperture 12. The center post 15 defines the rotative axis for the merry-go-round.

A leg 16 is located in each arcuate corner formation 14 and is secured to the leg plate 10 by a bolt and nut 17. The legs 16 are adapted to support the merry-go-round on any subjacent supporting surface such as the ground or floor. To provide greater rigidity and strength to the base, a plurality (a total of four in the embodiment shown) of struts 20 interconnect the lower end of each leg 16 with the lower end of the center post 15.

Rotatively mounted on the center post 15 above the leg plate 10 is a tubular sleeve 21. Attached as by welding, near the lower end of the tubular sleeve 21 is a square support plate 22. Each seat assembly includes a pair of parallel support bars 23 attached to the support plate 22 by bolts and nuts 24 on opposite sides of the tubular sleeve 21. At each end of the spaced, parallel support bars, 23, there is attached a seat 25. A pair of braces 26 have their upper ends rotatively mounted to the upper end of sleeve 21, such connection being covered by the tapered cap or cone 27. The lower ends of the braces 26 are attached to cross bars 30 interconnecting the spaced support bars 23.

The drive mechanism is perhaps best illustrated in FIGS. 2 and 4. Fixed to the platform 11 by a plurality (a total of four in the embodiment shown) of screw bolts and nuts 31 is a ratchet 32. As will appear from FIG. 2, the ratchet 32 is spaced from the platform 11 by a circular washer 33. A pair of vertically spaced, substantially square plates 34 and 35 are located about the center post 15 and receive the ratchet 32. As will appear from FIG. 4, the lower plate 34 is provided with a center opening 36 defined by a margin that rotatively bears on the outer periphery of the circular washer 33, the lower plate 34 seating on the platform 11. The uppermost plate 35 overlies the ratchet 32 and is provided with a center opening 37.

A pair of push bars 40 and 41 are pivotally mounted respectively by pins 42 and 43 to diagonal corners between the plates 34 and 35. The opposite ends of the bars 40 and 41 are pivotally mounted by rods 44 to handles 45 and 46 respectively. Each of the handles 45 and 46 is constructed of a pair of substantially U-shaped bars 47 arranged in back-to-back relation and pivoted to the support bars 23 forwardly of the associated seat 25. The child sits on the seat 25 and grips the uppermost portion of the handle 45 with his hands while his feet rest on the lowermost portion of the handle. The child can then oscillate the handle 45 by moving his hands and feet back and forth which causes a driving force to be applied through the associated push bar 40 or 41 as will be explained.

FIG. 4 of the drawing illustrates another pair of push bars 50 and 51 pivotally mounted to the other diagonal corners between the plates 34 and 35. These bars 50 and 51 would be attached to corresponding handles attached to another seat assembly frame arranged at right angles to the one shown in FIG. 1. This additional seat frame would be attached to the seat support plate 22 at right angles to the one illustrated and would be of identical construction and connection. With this modification, the merry-go-round is adapted to seat four children instead of two.

Figure 5:
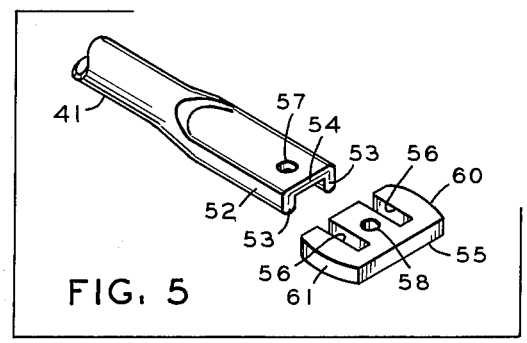
FIG. 5 is a perspective, exploded view of the push bar end and the associated cam.
Figure 7:
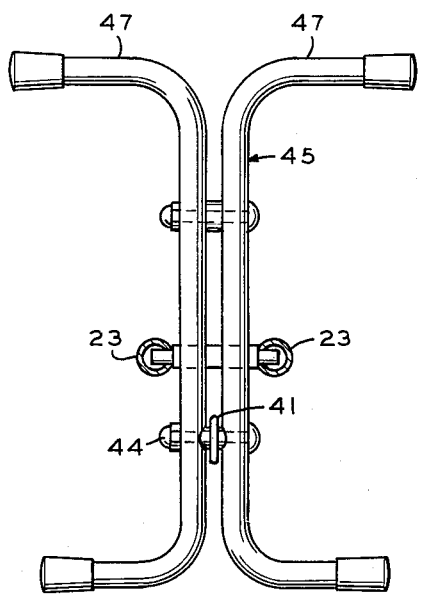
FIG. 7 is a rear elevational view of the manipulating means interconnecting the seat assembly with the drive mechanism.

One of the push bars 41 is provided with a substantially U-shaped channel construction at one end 52 as is best seen in FIG. 5. More particularly, the bar end 52 includes side walls 53 interconnected by an upper web portion 54. A cam 55 is carried by the bar end 52, the cam 55 being provided with a pair of spaced slots 56 adapted to receive the side walls 53 of the associated bar end 52. The pivot pin 43 extends through aligned openings 57 and 58 formed respectively in the web 54 and cam 55, thereby securing the cam 55 to the bar 52 and securing both elements to the spaced plates 34 and 35. The cam 55 extends laterally outward of opposite side walls 53 of the bar in 52, and is provided with curvilinear camming surfaces 60 and 61.

Figure 6:
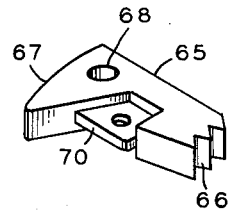
FIG. 6 is a perspective view of a pawl.

Pivotally mounted by pins 62 and 63 between the plates 34 and 35 are a pair of spaced pawls 64 and 65 respectively. The pawls 64 and 65 are of identical but reverse construction to provide an opposite engaging relation with the ratchet 32 to obtain a selective rotation of the seat frame in either direction. The detailed construction of the pawl 65 is best illustrated in FIG. 6. For example, the pawl 65 includes a plurality of teeth 66 at one end adapted to engage the ratchet 32 and includes a laterally projecting finger 67 at the opposite end adapted to engage the cam 55. A hole 68 is provided in the pawl 65 to receive the mounting pin 63. A tab 70 constitutes an attachment for one end of a tension spring 71 (FIG. 4), the spring 71 constituting a resilient means that extends between and interconnects the pawls 64 and 65 and tending to urge the teeth 66 of such pawls into engagement with the ratchet 32.

A shoulder 72 extends between and is fixed to the plate 34 and 35, the shoulder 72 engaging one side of the spring 71 and tending to hold the spring 71 away from contact with the ratchet 32.

A bearing member generally indicated at 73 (FIG. 2) is made of a sintered metal, is fitted over the center post 15, and seats on the top of ratchet 32. The bearing member 73 includes a lower collar 74 that extends through the plate opening 37, the outer periphery of the collar 74 providing a bearing surface for the top plate 35. The bearing 73 also includes a lateral flange 75 that extends over the top plate 35 and provides an upwardly facing shoulder 76 on which the lower end of tubular sleeve 21 rests. Another collar 77 on bearing member 73 extends upwardly into the lower end of tubular sleeve 21 so that its outer periphery forms a bearing surface for the sleeve 21 during rotation.

It is thought that the operation and functional advantages of the merry-go-round have become fully apparent from the foregoing detailed description of the parts, but for completeness of disclosure, the usage will be briefly described.

When the key push bar 41 is centered so that its longitudinal axis is aligned with the rotative axis defined by the center bar 15, the cam 55 engages the fingers 67 of pawls 64 and 65 to hold the teeth 66 of such pawls out of engagement with the ratchet 32 against the loading of spring 71 so that the interconnected plates 34 and 35, together with the associated seat assembly including sleeve 21, support bars 23 and seats 25 are in a free-wheeling condition. In other words, under this circumstance, the seat assembly is free to rotate relative to the base and about the center post 15 in either direction.

When it is desired to rotate the seat assembly in one direction, the seat assembly including the support bars 23 are rotated about the center post 15 to a greater degree than the angular movement of plates 34–35, so that the longitudinal axis of the push bars 40 and 41 are offset to one side of the rotative axis defined by the center post 15, as is suggested in FIG. 4. It will be noted that in this offset position, the cam 55 engages the projecting finger 67 of pawl 64 and holds the pawl 64 against the loading of spring 71 in a position so that the teeth 66 are disengaged from the ratchet 32. Simultaneously, the cam 55 engages the projecting finger 67 of the coacting pawl 65 and allows the pawl 65 to rotate under the force of tension spring 71 so that its teeth 66 operatively engages the ratchet 32.

When the handles 45 and 46 are oscillated by the children seated on the merry-go-round, the forces applied along the longitudinal axes of the push bars 40 and 41 is applied to the fixed ratchet 32 through the pawl 65, thereby exerting a rotational force to the plates 34–35 and to the seating assembly rotatable therewith. The pawl 65 enables rotation in one direction and precludes rotation in the opposite direction.

If it is desired to rotate the merry-go-round in the opposite direction, the relative position of the plates 34–35 and the seating assembly is reversed from that discussed previously so that the longitudinal axes of the push bars 40 and 41 are offset on the other side of the center rotative axis after having passed through the so-called neutral position. When the key push bar 41 is so located, the cam 55 operates to reverse the positions of the pawls 64 and 65. In other words, the cam 55 engages the projecting finger 67 of pawl 65 and holds the teeth 66 of such pawls 65 out of engagement with the ratchet, while the cam 55 allows the coacting pawl 64 to rotate under spring loading to a position in which the teeth 66 of such pawls 64 operatively engage the ratchet 32. In this case, the pawl 64 allows the plates 34–35 and the associated assembly to rotate in the opposite direction through a force applied by the push bars 40 and 41 to the ratchet 32 through the pawls 64.

Although the invention has been described by making detailed reference to a single embodiment, and a simple modification thereof, such detail is to be understood in an instructive, rather than in any restrictive sense, many variants being possible with the scope of the claims hereinto appended.

We claim as our invention.

1. In a merry-go-round:
   (a) a base,
   (b) a seat means rotatively mounted on the base,
   (c) a ratchet fixed relative to the base,
   (d) a plate means rotatively mounted on the base about the ratchet,
   (e) reversely constructed pawls pivotally mounted to the plate means and engaging the ratchet, one pawl precluding rotation of the plate means in one direction and another pawl precluding rotation in the opposite direction, (f) a bar pivotally connected to the plate means,
(g) a cam carried by the bar and engaging the said two pawls to pivot the pawls upon relative pivotal movement of the bar and plate means about their pivot connection for selectively engaging the pawls with the ratchet for controlling rotation of the plate in either direction, and
(h) a handle pivoted to the seat means and to the bar for turning the plate means and hence turning the seat means.

2. In a merry-go-round:
(a) a base including an upstanding post,
(b) a seat means rotatively mounted on the post,
(c) a ratchet located about and fixed relative to the post,
(d) a push bar means operatively interconnecting the ratchet with the seat means for rotating the seat means, the push bar means including a plate rotatively mounted on the post about the ratchet,
(e) a pair of reversely constructed pawls pivotally mounted to the plate, one of the pawls engaging the ratchet to preclude rotation of the plate in one direction, the other pawl engaging the ratchet to preclude rotation of the plate in the other direction,
(f) a spring interconnecting the pawls and tending to urge the pawls into engagement with the ratchet,
(g) a bar pivotally connected to the plate between the pawls, and
(h) a cam fastened to the bar and engaging said pivoted pawls, said cam holding the pawls away from the ratchet when the longitudinal axis of the bar is aligned with the rotative axis defined by the post, the cam pivotally moving the pawls to disengage one pawl from the ratchet and engage the other pawl when the longitudinal axis of the bar is offset to one side of the rotative axis of the plate upon relative movement of the bar and plate about their pivot connection, and the cam disengaging the said other pawl and engaging the said one pawl with the ratchet when the longitudinal axis of the bar offset to the other side of the plate axis.

3. In a merry-go-round:
(a) a base including a platform,
(b) a post extending upwardly through the platform,
(c) a ratchet located about the post and fixed to the platform,
(d) a pair of vertically spaced interconnected plates receiving the ratchet and mounted for rotation about the post, one of the plates overlying the ratchet,
(e) a sleeve disposed about the post above the plates,
(f) a bearing interconnecting the sleeve and the said plate overlying the ratchet to enable relative rotation,
(g) seat means fixed to and rotatable with the sleeve,
(h) reversely constructed pawls pivotally mounted between the plates and engaging the ratchet, one pawl precluding rotation of the plates in one direction and another pawl precluding rotation of the plates in the opposite direction,
(i) a bar pivotally mounted to and between the plates,
(j) a cam fixed to the bar and engaging the said two pawls to turn the pawls upon relative pivotal movement of the bar and plates about their pivot connection for selectively engaging the pawls with the ratchet, and
(k) a handle pivotally interconnecting the seat means with the bar for directing a force to the plates and hence to the ratchet through the cam and pawls so as to turn the plates and the seat means selectively in either direction about the post.

4. In a merry-go-round:
(a) a base including a platform,
(b) a post extending upwardly through the platform,
(c) a ratchet located about the post and fixed to the platform,
(d) a pair of vertically spaced interconnected plates receiving the ratchet and mounted for rotation about the post, one of the plates overlying the ratchet,
(e) a sleeve disposed about the post,
(f) a bearing interconnecting the sleeve and the one plate overlying the ratchet to enable relative rotation,
(g) seat means fixed to and rotatable with the sleeve,
(h) a pair of reversely constructed pawls pivotally mounted between the plates, one of the pawls engaging the ratchet to preclude rotation of the plates in one direction, the other pawl engaging the ratchet to preclude rotation of the plates in the opposite direction,
(i) resilient means interconnecting the pawls and tending to urge the pawls into engagement with the ratchet,
(j) a bar pivotally mounted to and between the plates,
(k) a cam attached to the bar engaging the pawls and selectively urging one or the other of the pawls into engagement with the ratchet upon relative movement of the bar and plates about their pivotal connection to control rotation of the plates in either direction, and
(l) a handle pivoted to the seat means and to the bar for turning the plates and turning the seat means.

5. In a merry-go-round as defined above in claim 14, in which:
(m) the bearing is located about the post and includes a surface on which the plate overlying the ratchet rotatively engages, and a surface on which the sleeve rotatively seats,
(n) the bar being pivoted to the plate between the pawls,
(o) the cam attached to the bar engaging the pawls to hold them disengaged from the ratchet when the longitudinal axis of the bar is aligned with the rotative axis of the plates, and
(p) the cam holding one pawl disengaged from the ratchet while holding the other pawl engaged with the ratchet when the longitudinal axis of the bar is offset to one side or the other of the rotative axis of the plates upon relative movement of the bar and plates about their pivotal connection in order to control the rotation of the plates and hence the seat means in either direction.

6. In a merry-go-round:
(a) a base including a platform,
(b) a post extending upwardly through the platform,
(c) a ratchet located about the post and fixed to the platform,
(d) a pair of vertically spaced interconnected plates receiving the ratchet, one of the plates overlying the ratchet and provided with an opening through which the post extends,
(e) a sleeve rotatively disposed about the post,
(f) seat means fixed to and rotatable with the sleeve,
(g) a pair of reversely constructed pawls pivotly mounted to and between the plates, each pawl having teeth and a laterally projecting finger, the teeth of one pawl engaging the ratchet to preclude rotation of the plates in one direction, the teeth of the other pawl engaging the ratchet to preclude rotation of the plates in the opposite direction,
(h) a spring extending between and interconnecting the pawls, the spring tending to urge the pawls into engagement with the ratchet,
(i) a bar pivotally mounted to and between the plates, the bar having a channel end of substantially U-shape,
(j) a cam provided with a pair of slots adapted to receive the U-shaped bar end,
(k) a pin extending through the bar end and cam to pivot the bar to the plates, and fasten the cam to the bar end,
(l) the cam having lateral cam surfaces engaging the fingers of the pawls, the cam holding the pawls out of engagement with the ratchet when the longitudinal axis of the bar is aligned with the rotative axis of the plates, the cam engaging the pawl fingers and pivotally moving the pawls to engage the teeth of one pawl with the ratchet while disengaging the teeth of the other pawl from the ratchet when the longitudinal axis of the bar is offset to one side or the other of the rotative axis of the plates so as to control the direction of rotation of the plates and seat means, and (m) a handle pivotally interconnecting the seat means with the bar for directing a force along the longitudinal axis of the bar to the plates and thus to the ratchet through the cam and pawls so as to turn the plates and the seat means selectively in either direction about the post.

References Cited by the Examiner
UNITED STATES PATENTS

| | | | |
|---|---|---|---|
| 1,476,832 | 12/23 | Peck | 272—33 |
| 2,107,568 | 2/38 | Haist | 74—157 X |

RICHARD C. PINKHAM, *Primary Examiner.*